(12) United States Patent
Zhao et al.

(10) Patent No.: US 8,133,707 B2
(45) Date of Patent: Mar. 13, 2012

(54) METHODS OF PREPARING ACTIVATED POLYMERS HAVING ALPHA NITROGEN GROUPS

(75) Inventors: Hong Zhao, Edison, NJ (US); Dechun Wu, Bridgewater, NJ (US)

(73) Assignee: Enzon Pharmaceuticals, Inc., Piscataway, NJ (US)

( * ) Notice: Subject to any disclaimer, the term of this patent is extended or adjusted under 35 U.S.C. 154(b) by 922 days.

(21) Appl. No.: 11/333,072

(22) Filed: Jan. 17, 2006

(65) Prior Publication Data

US 2007/0166808 A1 Jul. 19, 2007

(51) Int. Cl.
*C12P 7/18* (2006.01)

(52) U.S. Cl. ........ 435/158; 528/425; 528/422; 435/180; 525/535

(58) Field of Classification Search ............ 435/117, 435/226; 525/535, 438; 424/78.18, 278.1, 424/279.1; 526/352, 436; 530/402, 815; 546/1, 157
See application file for complete search history.

(56) References Cited

U.S. PATENT DOCUMENTS

| | | | |
|---|---|---|---|
| 4,179,337 A | 12/1979 | Davis et al. | |
| 5,122,614 A | 6/1992 | Zalipsky | |
| 5,681,567 A | 10/1997 | Martinez et al. | |
| 5,730,990 A | 3/1998 | Greenwald et al. | |
| 5,902,588 A | 5/1999 | Greenwald | |
| 6,113,906 A | 9/2000 | Greenwald | |
| 6,153,655 A | 11/2000 | Martinez et al. | |
| 6,177,087 B1 * | 1/2001 | Greenwald et al. | 424/278.1 |
| 2002/0183257 A1 * | 12/2002 | El-Tayar et al. | 514/16 |
| 2004/0097696 A1 * | 5/2004 | Noh et al. | 528/367 |
| 2004/0225097 A1 * | 11/2004 | Nho et al. | 526/333 |
| 2005/0197290 A1 | 9/2005 | Zhao et al. | |
| 2005/0214250 A1 | 9/2005 | Harris et al. | |
| 2007/0078257 A1 * | 4/2007 | Zhao et al. | 528/422 |

OTHER PUBLICATIONS

Swamikannu, A. et al., "Preparation and Characterization of p-Toluene Sulfonyl Ester and Amino Derivatives of Tri-and Poly(ethylene Glycol)" Journal of Polymer Science, vol. 22, 1984, pp. 1623-1632.
Kern, W. et al., "A Convenient Synthesis of alpha, omega-Diamino Substituted Oligo(oxyethylene)s" Makromol. Chem., vol. 180, 1979, pp. 2539-2542.

* cited by examiner

*Primary Examiner* — Randy Gulakowski
*Assistant Examiner* — Shane Fang
(74) *Attorney, Agent, or Firm* — Lucas & Mercanti, LLP

(57) ABSTRACT

Methods for preparing substantially non-antigenic polymers having lone electron pair-containing moieties in high purity are disclosed. The polymers are useful as intermediates for synthesis of amine-based polymers and in the formation of activated polymers for conjugation with nucleophiles. Conjugates and methods of preparation and treatment with the conjugates are also disclosed. The resultant polymer-amines are of sufficient purity so that expensive and time consuming purification steps required for pharmaceutical grade polymers are avoided.

22 Claims, No Drawings

US 8,133,707 B2

METHODS OF PREPARING ACTIVATED POLYMERS HAVING ALPHA NITROGEN GROUPS

FIELD OF THE INVENTION

The present invention relates to methods of preparing activated polymers such as polyalkylene oxides. In particular, the invention relates to methods of preparing linear polymers containing an alpha nitrogen group in high purity.

BACKGROUND OF THE INVENTION

The conjugation of water-soluble polyalkylene oxides with therapeutic moieties such as proteins and polypeptides is known. See, for example, U.S. Pat. No. 4,179,337, the disclosure of which is hereby incorporated by reference. The '337 patent discloses that physiologically active polypeptides modified with PEG circulate for extended periods in vivo, and have reduced immunogenicity and antigenicity.

To conjugate polyalkylene oxides, the hydroxyl endgroups of the polymer must first be converted into reactive functional groups. This process is frequently referred to as "activation" and the product is called an "activated polyalkylene oxide." Other polymers are similarly activated.

Commonly-assigned U.S. Pat. No. 5,730,990 describes one solution for addressing some of the problems associated with some polymer conjugation reactions. Specifically, it was determined that the polymer conjugate has a different pI than the unmodified protein, enzyme, etc. For example, PEGylation, i.e. attachment of the polymer to lysine epsilon amino groups results in a decrease in the isoelectric point and changes the pH optimum, i.e. the pH at which maximum bioactivity is observed. As reported in the '990 patent, it would be beneficial to restore the original pI or even alter the pI value of the polymer conjugate in order to optimize bioactivity at physiologic pH.

Over the years, it was determined that improvements in the synthetic procedure for preparing the activated polymers described in the '990 patent would be desirable, especially where a high degree of purity is required. Example 10 of the '990 patent indicates that reacting PEG-Cl and sarcosine at 750 for 4 days resulted in an N-methyl glycine PEG intermediate which was only 80% pure. It was also found that a portion of PEG-Cl reverted to PEG-OH, thus making it difficult to obtain high purity activated linkers or PEG conjugates made therewith.

In view of the foregoing, it would be desirable to provide improved methods for preparing activated polymers having alpha nitrogen groups. The present invention addresses this need.

SUMMARY OF THE INVENTION

In one preferred aspect of the invention, there are provided methods for preparing polymers having lone electron pair-containing moieties thereon. More preferably, the invention provides activated polymers and polymer conjugates having an alpha nitrogen group thereon. The methods include reacting a substantially non-antigenic polymer of the formula (I)

$$R_2\text{-}R_1\text{-}(L_1)_n\text{-}LG \qquad (I)$$

wherein
$R_1$ is a substantially non-antigenic polymer;
$R_2$ is a capping group, LG or $LG\text{-}(L_1)_n\text{-}$;
$L_1$ is a bifunctional linker;
LG is a leaving group such as a tosylate group or other groups as described hereinbelow; and
n=0 or positive integer,
with a compound having a lone electron pair-containing group thereon in an aqueous base, at a temperature of from about 10 to about 80° C. and for a reaction time of less than about 24 hours. In more preferred aspects of the invention, $R_1$ is a PEG having a molecular weight of from about 2,000 to about 100,000.

In some preferred aspects of the invention, the polymer of Formula (I) is reacted with a compound of Formula (III) which contains a lone electron pair-containing group thereon:

wherein
Z is O, S, or $NR_7$;
X is O, S or $NR_8$;
m is a positive integer, preferably 1; and
$R_4$, $R_5$, $R_6$, $R_7$ and $R_8$ are independently selected from the group consisting of H, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy and $C_{1-6}$ heteroalkoxy; provided that when Z is $NR_7$, $R_4$ and $R_7$ are both not H.

Within Formula (III), Z is preferably $NR_7$ and X is preferably O. One specifically preferred compound of Formula (III) is N-methyl-glycine or sarcosine. The reaction results in the formation of compounds corresponding to Formula IV(a) and IV(b).

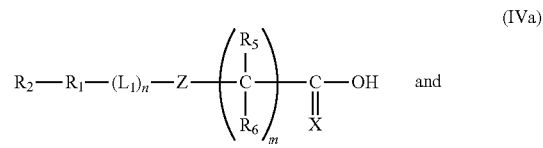

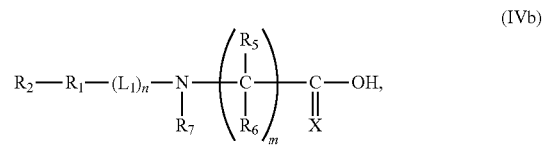

Once the polymer having the lone electron pair-containing moiety thereon has been formed in high purity, it can be reacted with any number of compounds having an activating group thereon to form an activated polymer which has an alpha nitrogen or lone electron pair-containing moiety thereon. One particularly preferred compound having an activating group thereon is N-hydroxysuccinimide (NHS) and the resulting activated polymer is

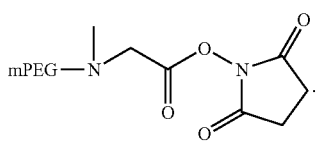

It will be appreciated that any one of the art recognized activating groups can be attached to the highly pure intermediate so that the activated polymer can be used to attach to a wide variety of biologically active nucleophiles and form PEG-conjugates. Some particularly preferred biologically active nucleophiles include asparaginase, adenosine deaminase and arginine deiminase.

One of the chief advantages associated with preferred aspects of the present invention is that the resulting alpha nitrogen-containing polymers such as the polyalkylene oxide derivatives thereof are prepared in high purity. Thus, product contaminants, namely, the starting materials and mPEG-OH are not found in appreciable amounts. In fact, in most aspects of the invention, they are found in amounts of less than about 5%, preferably less than about 2%. When the preferred alpha nitrogen containing PEG derivatives are more economically formed in high purity, the artisan can make end products which incorporate the PEG derivative more efficiently and at lower cost. The efficiencies result, in part, because separation of the desired alpha nitrogen containing intermediate (e.g. sarcosine) is not required and reversion of PEG-OTs to PEG-OH is substantially eliminated. Furthermore, tedious ion exchange or RP HPLC techniques are not required to provide the desired polymer. Thus, the present invention provides highly pure alpha nitrogen-containing PEG-amine without costly column purification.

Another advantage is the fact that the alpha nitrogen containing polymer made from the processes described herein will not change the backbone of the PEG at all. Therefore it will be compatible with all current and future applications for activated PEG's.

DETAILED DESCRIPTION OF THE INVENTION

The methods of the invention relate generally to the formation of polymers containing at least one alpha nitrogen group thereon. In most aspects of the invention, the polymers which can be modified using the processes described herein are substantially non-antigenic polymers. Within this genus of polymers, polyalkylene oxides are preferred and polyethylene glycols (PEG) are more preferred. For purposes of ease of description rather than limitation, the process is sometimes described using PEG as the prototypical polymer. It should be understood, however, that the process is applicable to a wide variety of polymers which can be linear, substantially linear, branched, etc. One of the requirements however is that the polymer contains the means for covalently attaching a moiety having a lone electron pair-containing group thereon under the conditions described herein.

In accordance with the foregoing, one preferred aspect of the invention for preparing a polymer having a lone electron pair-containing moiety thereon, includes reacting a polymer of the formula (I)

$$R_2\text{-}R_1\text{-}(L_1)_n\text{-}LG \qquad (I)$$

wherein
$R_1$ is a substantially non-antigenic polymer;
$R_2$ is a capping group, LG or LG-$(L_1)_n$
LG is a leaving group;
$L_1$ is a bifunctional linker; and
n=0 or positive integer preferably from about 1 to about 10, and more preferably 1,
with a compound having a lone electron pair-containing group thereon in an aqueous base at a temperature of from about 10 to about 80° C. and for a reaction time of less than about 24 hours. In some preferred aspects, the temperature ranges from about 30 to about 60° C., while in other aspects, the temperature ranges from about 45 to about 50° C. Preferred reaction times are less than about 18 hours and more preferably about 12 hours or less. The minimum time required is a time which is sufficient for substantial completion of the reaction. In most aspects, it is preferred that the reaction proceeds for at least about 4 hours.

Some preferred polymers of Formula I include

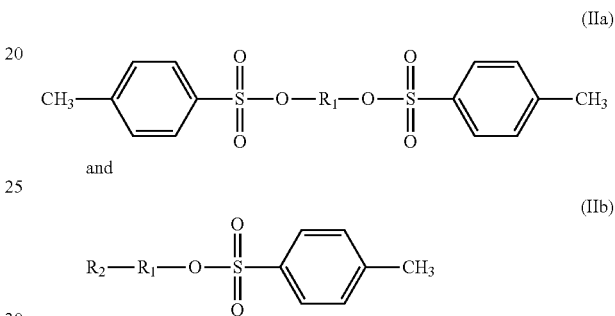

wherein
$R_2$ is methoxy; and
$R_1$ is a polyalkylene oxide.

It has been surprisingly found that when the leaving groups are limited to the specifically mentioned groups described herein and the reaction temperature and reaction time conditions are controlled as mentioned herein, highly pure alpha nitrogen-containing polymers can be formed. These products are substantially free of the shortcomings associated with those made using prior art methods.

Capping Groups

As stated above, $R_2$ can be a capping group, another leaving group (LG) or another leaving group and bifunctional linker. For purposes of the present invention, capping groups shall be understood to mean a group which is found on the terminal of the polymer. In most aspects, it is preferably methoxy. Other terminal groups as they are understood by those of ordinary skill can be used as alternatives.

Leaving Groups

In some preferred aspects of the invention, the leaving group (LG herein) is

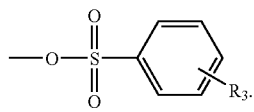

wherein $R_3$ is preferably methyl and the LG is tosylate. Alternatively, $R_3$ can be halogen, nitro, fluoromethyl, difluoromethyl, trifluromethyl, substituted carboxyl, or a multi-halogen substituted benzenesulfonyl. A non-limiting list of suitable alternative leaving groups includes mesylate, brosylate, tresylate and nosylate. PEG-tosylate and other compounds corresponding to Formula (IIa) and (IIb) can be obtained from commercial sources as essentially pure starting materials or made using standard techniques without undue experimentation.

Bifunctional Linkers

The polymers of the present invention may also include a bifunctional linking group ($L_1$) which is used for art-recognized purposes, including allowing a spacer or other optional group to be inserted between the PEG portion and the LG. Thus, the $L_1$ moiety can be selected from among bifunctional linking groups such as one of the following non-limiting compounds:

—NH(CH$_2$CH$_2$O)$_y$(CH$_2$)$_q$—,
—NH(CH$_2$CH$_2$O)$_y$CH$_2$CH$_2$—,
—NH(CR$_{10}$R$_{11}$)$_q$CH$_2$CH$_2$—,
—C(O)(CR$_{10}$R$_{11}$)$_q$NHC(O)(CR$_{13}$R$_{12}$)$_q$—,
—C(O)O(CH$_2$)$_q$—,
—C(O)(CR$_{10}$R$_{11}$)$_q$
—C(O)NH(CH$_2$CH$_2$O)$_y$(CH$_2$)$_q$—,
—C(O)O—(CH$_2$CH$_2$O)$_y$CH$_2$CH$_2$—,
—C(O)NH(CR$_{10}$R$_{11}$)$_q$—,
—C(O)O(CR$_{10}$R$_{11}$)$_q$—,
—C(O)NH(CH$_2$CH$_2$O)$_y$CH$_2$CH$_2$—,

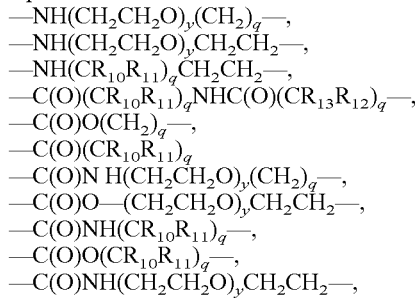

and wherein $R_{9-13}$ are independently selected from the same group as $C_{1-6}$ alkyls, etc. and preferably are each H or $CH_3$;

$R_{14}$ is selected from the same group as that which defines $R_{9-13}$ as well as $NO_2$, $C_{1-6}$ halo-alkyl and halogen;

q, t and y are each independently selected positive integers, from 1 to about 12.

The $L_1$ moieties are shown with respect to Formula (I):

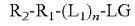

It will be understood that when the bis-activated polymers are desired, the $L_1$ groups are rotated so as to maintain proper orientation between $R_1$ and LG.

$R_1$ and Substantially Non-Antigenic Polymers $R_1$ is also preferably a polymer that is water soluble at room temperature such as a polyalkylene oxide (PAO) and more preferably a polyethylene glycol such as mPEG or bis-activated PEG. A non-limiting list of such polymers therefore includes polyalkylene oxide homopolymers such as polyethylene glycol (PEG) or polypropylene glycols, polyoxyethylenated polyols, copolymers thereof and block copolymers thereof, provided that the water solubility of the block copolymers is maintained.

For purposes of illustration and not limitation, the polyethylene glycol (PEG) residue portion of $R_1$ can be —CH$_2$CH$_2$—O—(CH$_2$CH$_2$O)$_x$—CH$_2$CH$_2$ wherein x is the degree of polymerization, i.e. from about 10 to about 2,300.

The degree of polymerization for the polymer represents the number of repeating units in the polymer chain and is dependent on the molecular weight of the polymer. Although substantially non-antigenic polymers, PAO's and PEG's can vary substantially in weight average molecular weight, preferably, $R_1$ has a weight average molecular weight of from about 200 to about 100,000 Daltons in most aspects of the invention. More preferably, the substantially non-antigenic polymer has a weight average molecular weight from about 2,000 to about 48,000 Daltons.

$R_1$ can also be a "star-PEG" or multi-armed PEG's such as those described in NOF Corp. Drug Delivery System catalog, 2005, the disclosure of which is incorporated herein by reference. Specifically, $R_1$ can be of the formula:

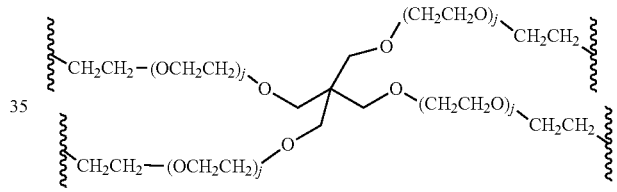

wherein:

j is an integer from about 10 to about 340, to preferably provide polymers having a total molecular weight of from about 12,000 to about 40,000; and at least 1, but up to 4, of the terminal portions of the residue is/are capped with a methyl or other lower alkyl. See also Nektar Catalog 2005-2006, page 26 "4-arm PEG", the contents of which are incorporated herein by reference. Such compounds prior to reaction with compounds of Formula III or sarcosine, preferably include:

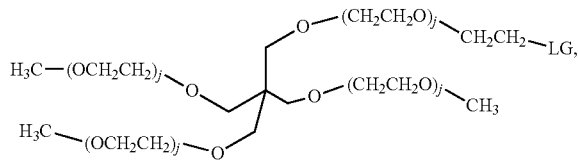

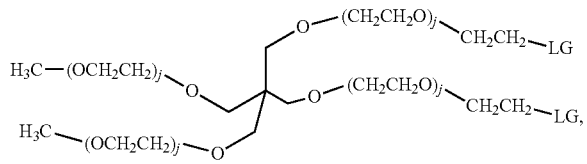

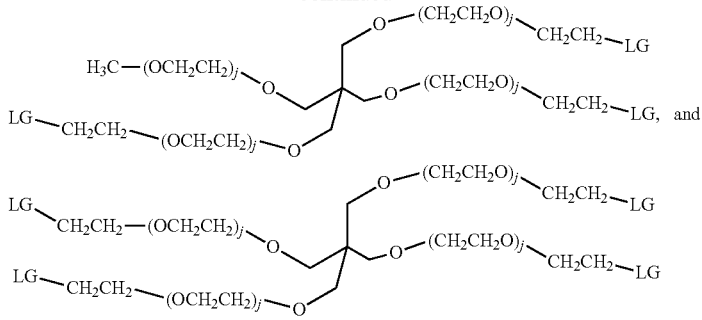

where LG is preferably

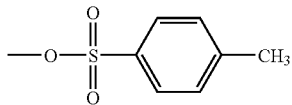

or another group described herein.

Also contemplated within the scope of the invention, is the formation of other PEG-based compounds having a lone electron pair-containing moiety thereon, including those branched polymer residues described in commonly assigned U.S. Pat. Nos. 5,605,976, 5,643,575, 5,919,455 and 6,113,906, the disclosure of each being incorporated herein by reference. A representative list of some specific polymers corresponding to Formula I includes:

(2a)

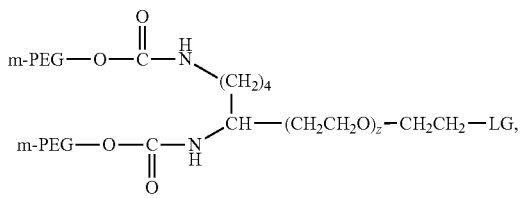

(2b)

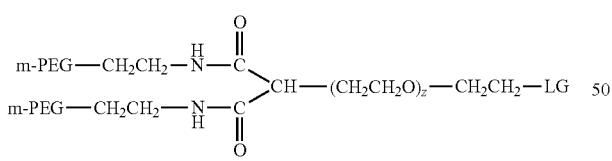

and (2c)

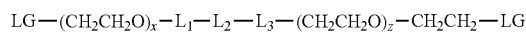

wherein

LG, x and $L_1$ are the same as that mentioned above and $L_2$ and $L_3$ are independently selected from the same group as that which defines $L_1$, or $L_2$ can alternatively be a branched linking group such as a diamino alkyl or lysine residue. See, for example, the aforementioned U.S. Pat. No. 6,113,906, for example; and z is an integer from 1 to about 120.

In a further embodiment, and as an alternative to PAO-based polymers, $R_1$ is optionally selected from among one or more effectively non-antigenic materials such as dextran, polyvinyl alcohols, carbohydrate-based polymers, hydroxypropylmethacrylamide (HPMA), polyalkylene oxides, and/or copolymers thereof. See also commonly-assigned U.S. Pat. No. 6,153,655, the contents of which are incorporated herein by reference. It will be understood by those of ordinary skill that the same type of activation is employed as described herein as for PAO's such as PEG. Those of ordinary skill in the art will further realize that the foregoing list is merely illustrative and that all polymeric materials having the qualities described herein are contemplated.

In one alternative aspect of the invention, when bis-activated polymers are desired, $R_2$ can be

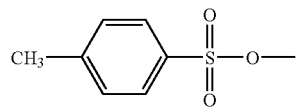

and the resultant reactant is used in making the bis-alpha nitrogen-containing polymer compounds. Such bis-activated polymers can be of formula (Ia):

(Ia)

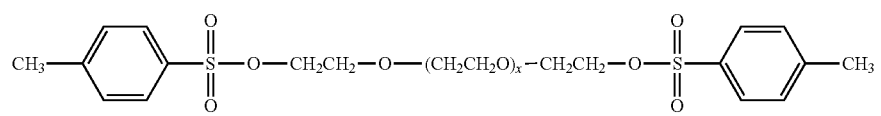

wherein x is the same as above.

Formation of the Lone Electron Pair or Alpha-Nitrogen-Containing Polymer

In certain aspects of the invention, the polymer of formula (I) is reacted with a compound having a lone electron pair-containing group thereon in an aqueous base. Some preferred compounds having the lone electron pair-containing group thereon correspond to the formula

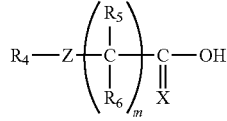
(III)

or preferably

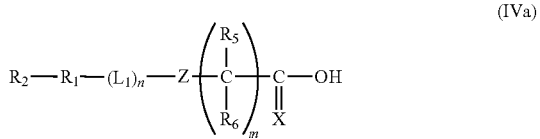
(IVa)

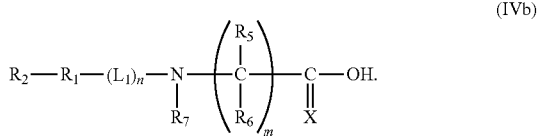
(IVb)

Others include

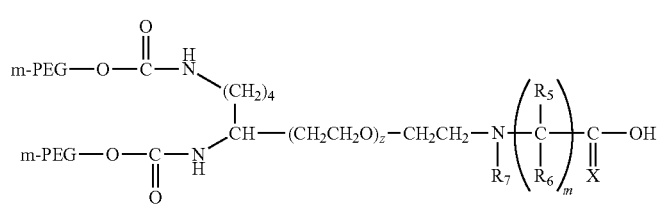
(3a)

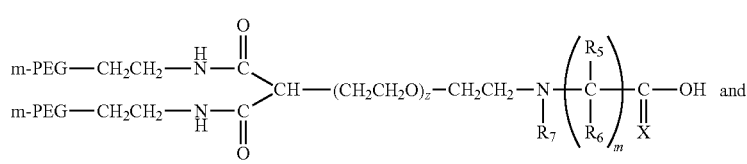
(3b)

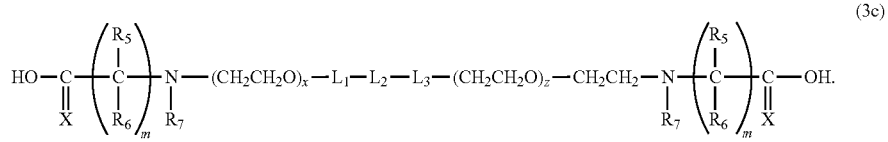
(3c)

wherein

Z is O, S, or $NR_7$;

X is O, S or $NR_8$;

m is a positive integer, preferably 1; and $R_4$, $R_5$, $R_6$, $R_7$ and $R_8$ are independently selected from the group consisting of H, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy and $C_{1-6}$ heteroalkoxy;

provided that when Z is $NR_7$, $R_4$ and $R_7$ are both not H.

More preferred in this aspect of the invention are compounds of (III) wherein X is O, m is 1, $R_4$ is methyl and $R_5$ and $R_6$ are each H. A still more preferred compound of formula (III) is N-methyl-glycine (sarcosine).

The reaction results in the formation of a polymer having a lone electron pair-containing moiety thereon such as those of Formula (IVa):

Compound 3 in the Examples, (below) is an example of the preferred mPEG-sarcosine compound corresponding to formula (IV).

The method of the invention is preferably carried out in an aqueous base such as one containing NaOH (preferred), KOH, LiOH, $Mg(OH)_2$, $Ca(OH)_2$ and the like or mixtures thereof. Mixed solvents of $H_2O$ and tetrahydrofuran (THF), dimethylformamide (DMF) and dioxane can be used along with auxiliary solvents, if desired.

The high-purity alpha-nitrogen-containing PEG-derivative can then be used in any art-recognized way. For example, and without limitation, it can be activated in any art recognized way (including those discussed below) and then used for direct conjugation with enzymes, proteins, peptides, etc. Alternatively, the $CO_2H$ derivative can be used for releasable-linkage to OH residues on biologically active compounds such as paclitaxel, camptothecin, etc.

Activation of the Alpha-Nitrogen-Containing Polymer

The Examples show activation of the mPEG-sarcosine with NHS(N-hydroxysuccinimide) and DIPC (diisopropyl-carbodiimide) as a preferred aspect of the invention. It will also be appreciated that any art-recognized conversion of the terminal $CO_2H$ is possible using compounds selected by virtue of having a desired functional group capable of reacting with a specific nuclephile. In most cases, the nucleophile found on a target for polymer conjugation will have amines, carboxylic acid groups, reactive carbonyl groups, hydroxyl groups, mercapto groups or the like. Without wishing to limited to specifics, suitable functional groups capable of reacting with an amine is selected from among a) carbonates, including p-nitrophenyl, or succinimidyl;
b) carbonyl imidazole;
c) azlactones;
d) cyclic imide thiones;
e) isocyanates or isothiocyanates; and
f) other active esters, including N-hydroxysuccinimidyl.

Some activated polymers in accordance with this aspect of the invention includes

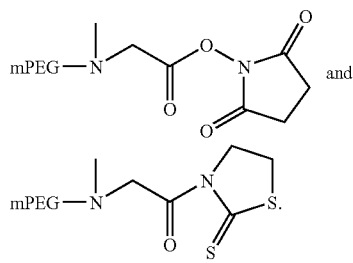

and

Similarly, suitable functional groups capable of reacting with carboxylic acid groups and reactive carbonyl groups can be selected from among hydrazine and hydrazide functional groups, including acyl hydrazides, carbazates, semicarbazates, and thiocarbazates, such as

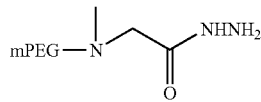

which can be made by reacting mPEG-sarcosine with hydrazine.

Biologically-Active Moieties For Conjugation

Once activated, the highly pure alpha nitrogen containing polymers can be reacted with any or a wide variety of biologically active nucleophiles. Biologically active nucleophiles of interest of the present invention include, but are not limited to, proteins, peptides, polypeptides, enzymes, organic molecules of natural and synthetic origin such as medicinal chemicals and the like.

Enzymes of interest include carbohydrate-specific enzymes, proteolytic enzymes, oxidoreductases, transferases, hydrolases, lyases, isomerases and ligases. Without being limited to particular enzymes, examples of enzymes of interest include asparaginase, arginase, arginine deiminase, adenosine deaminase, superoxide dismutase, endotoxinases, catalases, chymotrypsin, lipases, uricases, adenosine diphosphatase, tyrosinases and bilirubin oxidase. Carbohydrate-specific enzymes of interest include glucose oxidases, glucosidases, galactosidases, glucocerebrosidases, glucouronidases, etc.

Proteins, polypeptides and peptides of interest include, but are not limited to, hemoglobin, serum proteins such as blood factors including Factors VII, VIII, and IX; immunoglobulins, cytokines such as interleukins, α-, β- and γ-interferons, colony stimulating factors including granulocyte colony stimulating factors, platelet derived growth factors and phospholipase-activating protein (PLAP). Other proteins of general biological or therapeutic interest include insulin, plant proteins such as lectins and ricins, tumor necrosis factors, growth factors, tissue growth factors, TGFα's or TGFβ's and epidermal growth factors, hormones, somatomedins, erythropoietin, pigmentary hormones, hypothalamic releasing factors, antidiuretic hormones, prolactin, chorionic gonadotropin, follicle-stimulating hormone, thyroid-stimulating hormone, tissue plasminogen activator, and the like. Immunoglobulins of interest include IgG, IgE, IgM, IgA, IgD and fragments thereof.

Some proteins such as the interleukins, interferons and colony stimulating factors also exist in non-glycosylated form, usually as a result of using recombinant techniques. The non-glycosylated versions are also among the biologically active nucleophiles of the present invention.

The biologically active nucleophiles of the present invention also include any portion of a polypeptide demonstrating in-vivo bioactivity. This includes amino acid sequences, antisense moieties and the like, antibody fragments, single chain antigen binding proteins, see, for example U.S. Pat. No. 4,946,778, disclosure of which is incorporated herein by reference, binding molecules including fusions of antibodies or fragments, polyclonal antibodies, monoclonal antibodies, catalytic antibodies, nucleotides and oligonucleotides.

The proteins or portions thereof can be prepared or isolated by using techniques known to those of ordinary skill in the art such as tissue culture, extraction from animal sources, or by recombinant DNA methodologies. Transgenic sources of the proteins, polypeptides, amino acid sequences and the like are also contemplated. Such materials are obtained from transgenic animals, i.e., mice, pigs, cows, etc., wherein the proteins are expressed in milk, blood or tissues. Transgenic insects and baculovirus expression systems are also contemplated as sources. Moreover, mutant versions of proteins, such as mutant TNF's and mutant interferons are also within the scope of the invention.

Other proteins of interest are allergen proteins such as ragweed, Antigen E, honeybee venom, mite allergen, and the like.

Useful biologically active nucleophiles are not limited to proteins and peptides. Essentially any biologically-active compound is included within the scope of the present invention. Chemotherapeutic molecules such as pharmaceutical chemicals i.e. anti-tumor agents, cardiovascular agents, anti-neoplastics, anti-infectives, anti-anxiety agents, gastrointestinal agents, central nervous system-activating agents, analgesics, fertility or contraceptive agents, anti-inflammatory agents, steroidal agents, anti-urecemic agents, cardiovascular agents, vasodilating agents, vasoconstricting agents and the like are included. In preferred aspects of the invention, the carboxylic acid derivative is reacted under conditions which afford an ester linkage between the polymer and chemotherapeutic moiety. One particularly preferred biologically active nucleophile is asparaginase whether from nature, *E. coli* fermentation, i.e. Elspar, or other bacterica, fungi, yeasts, etc., or recombinantly expressed sources as well such as ECAR-LANS a recombinant L-asparaginase from *Erwinia* carotovora or other humanized recombinant L-asparaginase.

The foregoing is illustrative of the biologically active nucleophiles which are suitable for conjugation with the polymers of the invention. It is to be understood that those biologically active materials not specifically mentioned but having suitable nucleophilic groups are also intended and are within the scope of the present invention.

Conjugation reactions, sometimes referred to as PEGylation reactions, are generally carried out in solution with from about an equimolar to about a several fold molar excess of activated polymer relative to a protein to be conjugated. Preferably, the molar excess of activated polymer over protein is about 10-fold, or greater. One way to maintain the protein bioactivity is to substantially avoid linking to amino acid residues associated with an active site of the protein. For example, for the protein arginine deiminase, it is desired to avoid linking to those arginine deiminase lysine epsilon amino groups associated with the active site in the polymer coupling process. Given the usually non-specific nature of the coupling reaction, this theoretical step is often difficult to achieve in practice. In certain optional embodiments, the protein to be conjugated is engineered to include specific residues at locations distal to any active site, e.g., by inserting engineered cysteine or oligolysine residues at specific sites on the protein structures, and then employing an activated polymer of the invention containing an alpha nitrogen that preferably conjugates at those engineered residues.

The conjugation reaction is carried out under relatively mild conditions to avoid inactivating the protein. Mild conditions include maintaining the pH of the reaction solution in the range of 6-8 and the reaction temperatures within the range of from about 10°-20° C. Suitable buffers include buffer solutions able to maintain the preferred pH range of 6-8 without interfering with the conjugation reaction. A non-limiting list of suitable buffers includes, e.g., phosphate buffer, citrate buffer, acetate buffer.

Although the reaction conditions described herein may result in some unmodified protein, the unmodified protein can be readily recovered and recycled into future batches for additional conjugation reactions.

The reaction conditions for effecting conjugation further include conducting the attachment reaction with from about an equimolar to about a large molar excess of the activated polymer with respect to the protein or other target. For example, the process can be carried out with about 1-600-fold molar excess of polymer; preferably about 1-100-fold molar excess of polymer and most preferably about 1.75-5-fold molar excess of polymer. It will be understood that, depending upon the preferences of the artisan, the activated polymer may be added as a solid or in solution to the target protein. The conjugation reaction is carried out over a temperature range from about 10 to about 20° C. The reaction time will also vary according to the preference of the artisan and can range from less than one hour to twenty-four hours or even longer, depending upon the activated polymer selected. Quenching of the reaction is optional.

EXAMPLES

The following examples serve to provide further appreciation of the invention but are not meant in any way to restrict the effective scope of the invention.

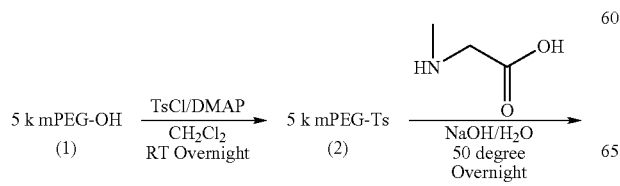

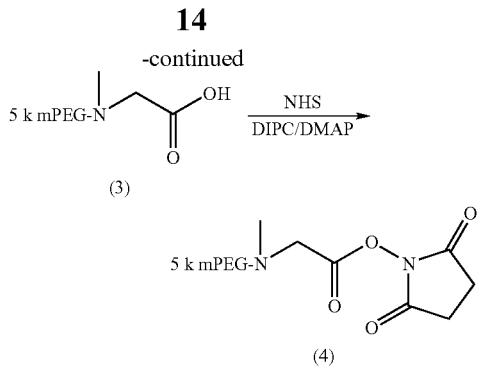

Example 1

Preparation of 5 k mPEG-Ts 5 k mPEG-OH (compound 1, 50 g, 10 mmol) and DMAP (5.89 g, 48 mmol) were dissolved in 300 ml of $CH_2Cl_2$. Separately p-Toluenesulfonyl chloride (9.35 g, 50 mmol) was dissolved in 200 ml of $CH_2Cl_2$. The prepared p-Toluenesulfonyl chloride solution was then added to the 5 k mPEG-OH solution over 2 to 3 hours with additional funnel. The reaction mixture was stirred at room temperature overnight. 250 ml of $CH_2Cl_2$ was added to the reaction mixture followed by washing the reaction mixture with 0.1 N HCl twice. $CH_2Cl_2$ layer was separated and dried with $MgSO_4$. The solvent was removed as much as possible. The residue was dissolved in 75 ml of $CNCH_3$ and product was precipitated with addition of 1500 ml of IPA. The solids were filtered and washed with IPA twice and ether twice. The final product (compound 2) was dried under vacuum at 40 degrees (48.4 g, 96.8% yield). Purity>99% as judged by NMR.

$^{13}C$ NMR ($CDCl_3$) δ 21.3 (—$CH_3$), 58.6 (—$OCH_3$), 68.2-71.4 ($OCH_2CH_2O$ in PEG), 127.4, 129.3, 132.5, 144.1 (aromatic C).

Example 2

Preparation of 5 k mPEG-Sarcosine (3)

NaOH (3.49 g, 87.31 mmol) and sarcosine (7.77 g, 87.31 mmol) were dissolved in 180 ml of $H_2O$. 5 k mPEG-Ts (compound 2, 45 g, 8.73 mmol) was added. The reaction mixture was heated to 45 to 50 degrees C. and kept at this temperature for 12 hours followed by cooling to RT. The reaction mixture was extracted with $CH_2Cl_2$ twice. The combined $CH_2Cl_2$ layer was back washed with $H_2O$. The organic layer was dried with $MgSO_4$. The solvent was removed and the residue was dissolved in 110 ml of 0.25 N HCl. The product was extracted with $CH_2Cl_2$ twice. The combined $CH_2Cl_2$ layer was dried with $MgSO_4$. The solvent was removed and the residue was dissolved in 130 ml of $CH_2Cl_2$ and the product was precipitated with 900 ml of ethyl ether. The final product (compound 3) was filtered, washed with ether and dried under vacuum at 40 degrees (38.8 g, 86.2% yield). Purity>95% as judged by NMR.

$^{13}C$ NMR ($CDCl_3$) δ 42.0 (—$NCH_3$), 54.2 (—$CH_2NCH_2$—), 58.6 (—$OCH_3$), 65.5-71.4 ($OCH_2CH_2O$ in PEG), 166.0 (—C=O).

Example 3

Preparation of 5 k mPEG-Sarcosine NHS 5 k mPEG-Sarcosine (compound 3, 15 g, 2.958 mmol) was dissolved in 100 ml of $CH_2Cl_2$. N-Hydroxysuccinimide (510 mg, 4.437 mmol). Diisopropylcarbodiimide (559 mg, 4.437 mmol) and 4-Dimethylamino-Pyridine (361 mg, 2.958 mmol) were added. The mixture was stirred at RT overnight. The reaction mixture was filtered. The solvent was removed as much as possible. The residue solids were dissolved in 30 ml of $CH_2Cl_2$ and precipitated with 350 ml of ethyl ether. The solids were filtered and washed with ether. The wet solids were re-crystallized from 750 ml of IPA. The solids were filtered, washed with IPA twice, ether twice. The product (compound 4) was dried under vacuum at 40 degrees (yield=13.5 g). 90% yield. Purity>95%.

$^{13}C$ NMR (CDCl3) δ 25.1 (—$CH_2CH_2$—), 42.0 (—$NCH_3$), 54.8-54.9 (—$CH_2NCH_2$—), 58.5 (—$OCH_3$), 68.8-71.4 ($OCH_2CH_2O$ in PEG), 165.3 (—C═O), 168.5 (—O═CNC═O—).

Example 4

PEG-Sarcosine-ASN-ase

With fast stirring, PEG powder at 100:1 reaction molar ratio of PEG to protein was added to 5 ml of 5 mg/ml Asparaginase (Elspar-Merck) in 0.1 M sodium phosphate, pH 7.6. The reaction was conducted at 30° C. under $N_2$ for 60 min and stopped by lowering pH to 6.0 or immediately purified on a size exclusion column.

The reaction mixture was diluted with 20 mM sodium phosphate, pH 6.0 to 50 ml, filtered through 0.45 μm filter, and separated on HiLoad Superdex 200 column (Amersham, N.J.). The column was equilibrated in 140 mM NaCl, 20 mM NaP, pH 6.0 and the conjugate was eluted out at 10 ml/fraction/min. The fractions of the peak identified on SDS-PAGE were pooled and concentrated using Ultrafree 30K (Millipore Corp., Bedford, Mass.) to give PEG-sacrosine-ASNase.

Example 5

PEG-Sarcosine-Oligonucleotide (Genasense)

To a solution of Genasense (25 mg, 3.9 μmol) (Genta, Berekeley Heights, N.J.) in PBS buffer (5 mL, pH 7.8) was added mPEG-Sarcosine NHS 4 (150 mg, 39 μmol) and stirred at room temperature for 5 hrs. The reaction solution was extracted with DCM (3×10 mL) and brine (10 mL), and the combined organic layers were dried ($MgSO_4$), filtered, and the solvent was evaporated under reduced pressure. The residue was dissolved in double distilled water (5 mL) and loaded on a DEAE fast flow, weak anion exchange column (27 mm×250 mm, bed volume ~50 mL) which was pre-equilibrated with 20 mM Tris-HCl buffer, pH 7.4. The un-reacted PEG linkers were eluted with water (3 to 4 column volumes) and the product then eluted with a gradient of 0 to 100% 1 M NaCl in 20 mM Tris-HCl buffer, pH 7.4 in 10 min, followed by 100% 1 M NaCl in 20 mM Tris-HCl buffer, pH 7.4 for 10 min at a flow rate of 3 mL/min. The fractions containing pure product were pooled and desalted with an Amicon stirred cell concentrator using Ultracell membrane with Molecular Weight cut off 5000 and the resulting solution was lyophilized to yield pure PEG-sacrosine-Genasense (15.7 mg, 2.42 μmol, 60%). ESI-MS observed mass for released oligonucleotide 5879.1, calculated mass 5879.8.

Comparative Examples 6-7

In order to demonstrate the improvement in purity provided by the present invention, the synthesis preformed in Examples 10-11 of U.S. Pat. No. 5,730,990 was recalled. See below:

Example 6

Synthesis of mPEG-Sarcosine 5 k mPEG-Cl (25 g, 4.98 mmol) was added to the solution of N-methyl glycine (sarcosine) in NaOH solution (150 ml, 0.33 M) and the mixture was placed in a sealed polypropylene bottle and heated at 75° C. for 4 days. The reaction mixture was cooled to room temperature and pH was adjusted to 6.0/6.5 with dilute HCl. The aqueous solution was extracted with $CH_2Cl_2$ and the solvent was removed under reduced pressure. The resulting solid was recrystallized from 2-propanol to give title compound in 77% yield. $^{13}C$ NMR: ($CDCl_3$) δ; 41.31 ($NCH_3$); 54.57 ($CH_2N$); 57.85 ($CH_2C$); 58.04 ($OCH_3$); 167.98 (CO). Purity determined to be ~80% by $^{13}C$-NMR.

Example 7

Preparation of 5 k mPEG-Sarcosine NHS 5 k mPEG-Sarcosine (18 g, 3.55 mmol) was dissolved in anhydrous methylene chloride (90 ml) followed by the addition of N-hydroxy-succinimide (612 mg, 5.32 mmol) and diisopropyl carbodiimide (671 mg, 5.32 mmol). The mixture was stirred overnight at room temperature. The resulting solids were filtered and the solvent was removed in vacuo. The crude product was recrystallized from 2-propanol to give the title compound in 94% yield. $^{13}C$ NMR: ($CDCl_3$) δ; 24.73 ($CH_2$ succinimide); 41.60 (N—$CH_3$); 54.57 ($NCH_2$); 54.44 ($CH_2C$); 58.11 ($OCH_3$); 165.13 (CO) 168.48 (C succinimide). Purity determined to be approximately 80%.

| Comparative Results | |
| --- | --- |
| Method | % purity of PEG-N—COOH |
| -PEG-Cl as LG with extended reaction time and high temperature | ~80% |
| PEG-OTs as LG (new) with shorter reaction time and lower reaction temperature | >95% |

As can be seen from the foregoing, significant improvements in purity were realized by using the procedure described herein and C-GMP grade activated polymer can be prepared efficiently.

What is claimed is:

1. A method of preparing a polymer having a lone electron pair-containing moiety thereon, comprising:

reacting a polymer of formula (I)

$$R_2\text{-}R_1\text{-}(L_1)_n\text{-}LG \qquad (I)$$

wherein $R_1$ is a substantially non-antigenic polymer;
$R_2$ is a capping group, LG or LG-$(L_1)_n$-;
$L_1$ is a bifunctional linker;
LG is a leaving group selected from the group consisting of

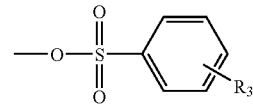

wherein R₃ is methyl, halogen, nitro, fluoromethyl, difluoromethyl, trifluoromethyl, or substituted carboxyl; a multi-halogen substituted benzenesulfonyl; mesylate; brosylate; tresylate, and nosylate; and n is 0 or positive integer, with a compound of Formula (III) in an aqueous base at a temperature of from about 45 to about 50° C. and for a reaction time of less than about 18 hours, wherein the compound of Formula (III) is

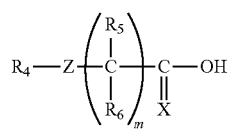

wherein

Z is $NR_7$;

X is O, S or $NR_8$;

m is a positive integer;

$R_4$ is H;

$R_5$, $R_6$, $R_7$ and $R_8$ are independently selected from the group consisting of H, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ heteroalkyls, substituted $C_{1-6}$ heteroalkyls, $C_{1-6}$ alkoxy, phenoxy and $C_{1-6}$ heteroalkoxy, provided that $R_4$ and $R_7$ are both not H; and the aqueous base is selected from the group consisting of NaOH, KOH, LiOH, Mg(OH)₂, Ca(OH)₂ and mixtures thereof, wherein 10 molar equivalent of compound of Formula (III) is employed for each equivalent of LG; and the purity of the polymer having the lone electron pair-containing moiety thereon formed by said method is greater than 95%.

2. The method of claim 1, wherein the reaction time is less than about 12 hours.

3. The method of claim 1, wherein $R_2$ is methoxy.

4. The method of claim 3, wherein LG is

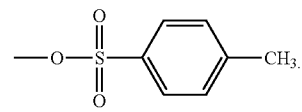

5. The method of claim 1, wherein X is O, m is 1, $R_5$ and $R_6$ are each H, and $R_7$ is methyl.

6. The method of claim 1, wherein the compound of formula (III) is N-methyl-glycine (sarcosine).

7. The method of claim 1, wherein $R_1$ is a polyalkylene oxide.

8. The method of claim 1, wherein the polymer of Formula (I) is selected from the group consisting of

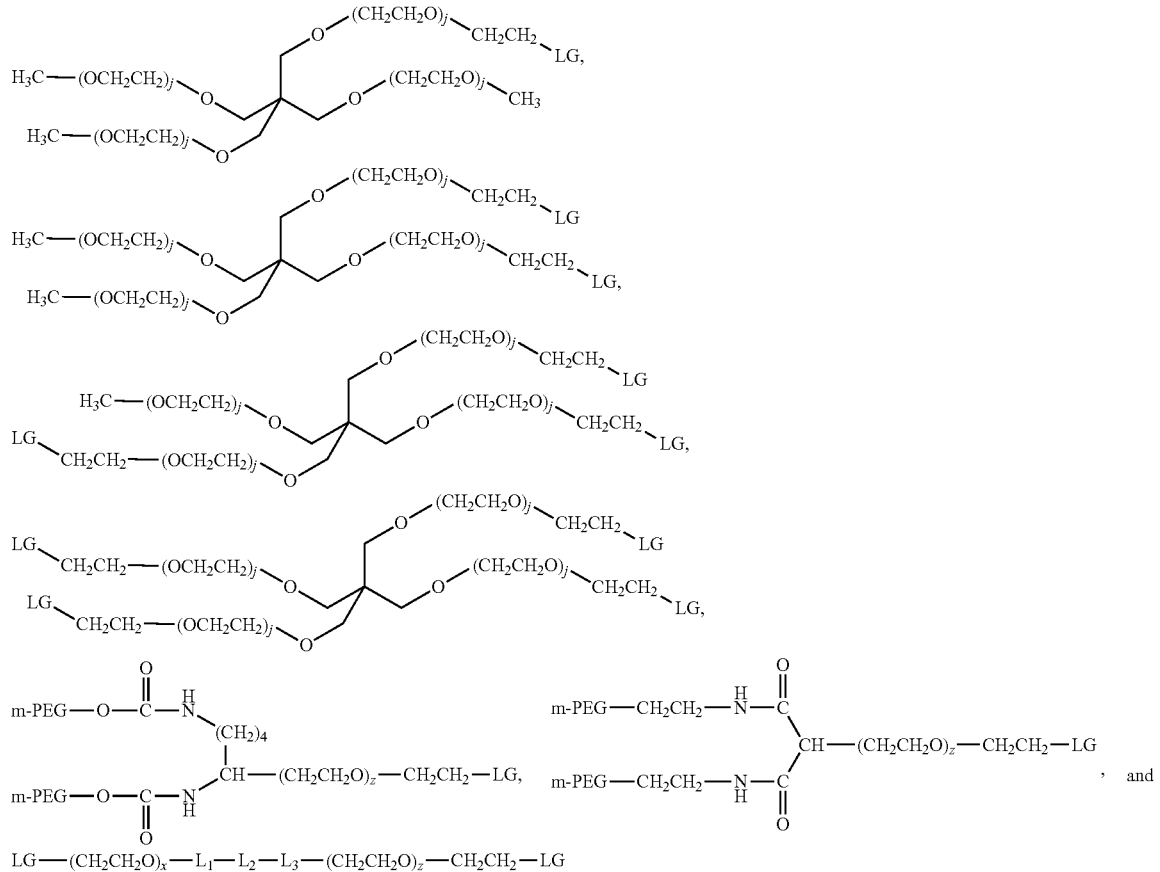

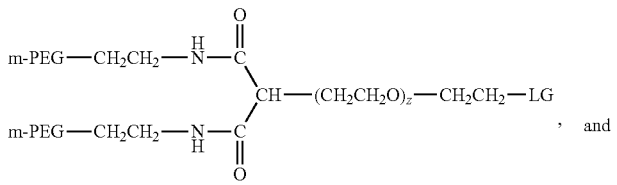

, and wherein
j is an integer from about 10 to about 340;
x is an integer from about 10 to about 2,300;
$L_1$, $L_2$ and $L_3$ are bifunctional linkers; and
z is an integer from 1 to about 120.

9. The method of claim 7, wherein said polyalkylene oxide is a polyethylene glycol of the formula: —$CH_2CH_2$—O—($CH_2CH_2O$)$_x$—$CH_2CH_2$ wherein x is an integer from about 10 to about 2,300.

10. The method of claim 1, wherein the substantially non-antigenic polymer has a weight average molecular weight from about 200 to about 100,000 Daltons.

11. The method of claim 10, wherein the substantially non-antigenic polymer has a weight average molecular weight from about 2,000 to about 48,000 Daltons.

12. The method of claim 1, wherein the polymer of formula (I) is:

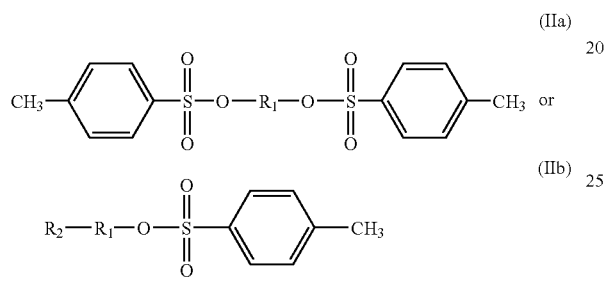

wherein
$R_2$ is methoxy; and
$R_1$ is a polyalkylene oxide.

13. The method of claim 12, wherein $R_1$ is a polyethylene glycol.

14. The method of claim 1, wherein the aqueous base is NaOH.

15. The method of claim 1, wherein the polymer having the lone electron pair-containing moiety thereon is

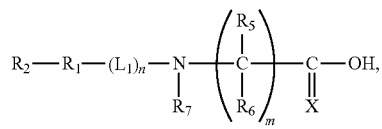

wherein
X is O or S;
m is 1;
n is 0 or 1;
$R_5$ and $R_6$ are independently selected from the group consisting of H, $C_{1-6}$ alkyls, $C_{3-12}$ branched alkyls, $C_{3-8}$ cycloalkyls, $C_{1-6}$ substituted alkyls, $C_{3-8}$ substituted cycloalkyls, aryls, substituted aryls, aralkyls, $C_{1-6}$ alkoxy, and phenoxy; and
$R_7$ is selected from the group consisting of $C_{1-6}$ alkyls, $C_{3-12}$ branchedalkyls, $C_{3-8}$ cycloalkyls, $C_{1-6}$ substituted alkyls, $C_{3-8}$ substituted cycloalkyls, aryls, and substituted aryls.

16. The method of claim 1, further comprising reacting the polymer having the lone electron pair-containing moiety thereon with a compound having an activating group thereon to form an activated polymer having a lone electron pair-containing moiety thereon.

17. The method of claim 16, wherein the activated polymer having the lone electron pair-containing moiety thereon is

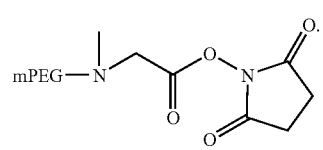

18. The method of claim 16, wherein the compound having the activating group thereon has a functional group capable of reacting with a nucleophile.

19. The method of claim 1, wherein the purity of the polymer the polymer having the lone electron pair-containing moiety thereon formed by said method is greater than 98%.

20. The method of claim 17, further comprising reacting

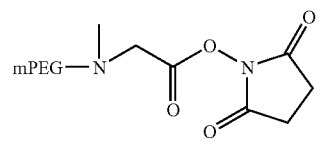

with asparaginase under conditions sufficient to form conjugates.

21. The method of claim 20, wherein said asparaginase is derived from a recombinant source.

22. The method of claim 1, wherein $R_1$ is a linear, branched or multi-armed polymer.

* * * * *